US006879245B2

(12) United States Patent
Asai et al.

(10) Patent No.: US 6,879,245 B2
(45) Date of Patent: Apr. 12, 2005

(54) RADIO PAGING RECEIVER WITH CONTROL MEANS FOR CONTROLLING CHARACTER SIZE FOR MESSAGES DISPLAYED IN SUCCESSIVE SCREENS BASED ON THE TOTAL NUMBER OF CHARACTERS IN THE MESSAGE

(75) Inventors: Takayuki Asai, Tokyo (JP); Kuniaki Koga, Shizuoka (JP); Takayasu Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 08/784,471

(22) Filed: Jan. 17, 1997

(65) Prior Publication Data

US 2003/0011468 A1 Jan. 16, 2003

Related U.S. Application Data

(63) Continuation of application No. 08/537,980, filed on Oct. 2, 1995, now abandoned, which is a continuation of application No. 08/111,512, filed on Aug. 24, 1993, now abandoned.

(30) Foreign Application Priority Data

Aug. 26, 1992 (JP) .......................................... 4-248888
Aug. 26, 1992 (JP) .......................................... 4-248889

(51) Int. Cl.[7] .......................................... H04Q 1/00
(52) U.S. Cl. .......................................... 340/7.55
(58) Field of Search .......................... 340/825.44, 311.1, 340/731, 7.51, 7.55, 7.56; 455/38.1; 379/57; 345/127

(56) References Cited

U.S. PATENT DOCUMENTS 4,896,147 A * 1/1990 Futakata ..................... 345/472
5,212,477 A 5/1993 Indekeu et al. ........ 340/825.44

FOREIGN PATENT DOCUMENTS

WO WO 9016052 12/1990 ............ G08B/5/22

OTHER PUBLICATIONS

Patent Abstracts of Japan, vol. 16, No. 579 (E–1299), Dec. 18, 1992, and JP–A–04 225 629.
Database WPI, Week 9321, Derwent Publications, Ltd., London, Great Britain, AN 93175611.

* cited by examiner

*Primary Examiner*—Brian Zimmerman
(74) *Attorney, Agent, or Firm*—Sughrue Mion, PLLC

(57) ABSTRACT

A radio paging receiver with a display unit which includes a character generator, display section, and display control unit for reading character patterns corresponding to constituent elements of a message contained in a paging signal from said character generator, controlling the display section on the basis of the read character patterns, and displaying the message on the display section, wherein the display control unit includes a function of displaying constituent elements of messages having different sizes on the display section.

4 Claims, 20 Drawing Sheets

FIG. 12

| | | | | | | |
|---|---|---|---|---|---|---|
| ID | M1 | M2 | M3 | M4 | M5 | M6 |

FIG. 13

| | | | | | | |
|---|---|---|---|---|---|---|
| ID | CS | M1 | M2 | M3 | M4 | M5 |

RADIO PAGING RECEIVER WITH CONTROL MEANS FOR CONTROLLING CHARACTER SIZE FOR MESSAGES DISPLAYED IN SUCCESSIVE SCREENS BASED ON THE TOTAL NUMBER OF CHARACTERS IN THE MESSAGE

This is a Continuation of application Ser. No. 08/537,980 filed on Oct. 2, 1995 now abandoned, which is a continuation of prior application Ser. No. 08/111,512 filed Aug. 24, 1993 (abandoned).

BACKGROUND OF THE INVENTION

1. Field of the Invention

The present invention relates to a radio paging receiver with a display unit having a function of displaying a received message on a screen.

2. Description of the Prior Art

In recent years, innovative technical developments have been remarkably made for radio paging receivers. In place of a tone-only type radio paging receiver having only a function of notifying a user of being paged by sounds a radio paging receiver with a display unit having a function of displaying a message on a screen has been popularly used.

In a prior art radio paging receiver of this type with a display unit, characters and numbers in a received message are displayed on the display unit in a predetermined size. When a message cannot be displayed on one screen because the size of the message is large, the screen is switched by a user, the message is continuously displayed on a plurality of screens.

FIG. 1 is a view showing a liquid crystal display section 171 in an example of the prior art radio paging receiver having a message display function.

As shown in FIG. 1, the liquid crystal display section 171 has a message display portion 172 for displaying a message, and the message display portion 172 is divided into a plurality of unit regions 173 each having a predetermined size (dot count). Each of the unit regions 173 is a region in which a unit display component such as one character or one number is displayed.

When a conventional radio paging receiver having the above liquid crystal display section 171 receives a self-paging signal containing a message, each unit display component such as one character or one number is displayed on a corresponding one of the unit regions 173. When the message cannot be displayed on one screen because the number of characters in the message is large, a screen switching operation is performed by a user, and the message is continuously displayed on a plurality of screens.

As described above, in the conventional radio paging receiver having the display unit, the message display portion for displaying a message is divided into unit regions each having a predetermined dot count, and each unit display component is displayed on a corresponding one of the unit regions. For this reason, the following problem is posed.

That is, when the message display portion is divided into a large number of unit regions, the number of characters which can be displayed on one screen is increased. For this reason, when a long message is to be displayed, the number of screen switching operations is decreased. However, since the dot count in each unit region is decreased, even when a short message is to be displayed, characters and the like are displayed in a small size, and the displayed message cannot be easily read.

When a message display portion is divided into a small number of regions, the dot count in each unit display element is increased, and the displayed message can be easily read. However, when a long message is received, a screen switching operation must be disadvantageously performed many times.

SUMMARY OF THE INVENTION

It is an object of the present invention to provide a radio paging receiver with a display unit, in which the size of each character displayed on a message display portion is changed in accordance with the length of a message to be displayed, so that the number of screen switching operations can be decreased when a long message is displayed, and characters and the like which can be easily read can be displayed when a short message is displayed.

In order to achieve the above object, according to the first aspect of the present invention, there is provided a radio paging receiver with a display unit which includes a character generator, a display section, and display control means for reading character patterns corresponding to constituent elements of a message contained in a paging signal from the character generator, controlling the display section on the basis of the read character patterns, and displaying the message on the display section, wherein the display control means includes a function of displaying constituent elements of messages having different sizes on the display section.

According to the second aspect of the present invention, there is provided a radio paging receiver with a display unit of the first aspect, further comprising a counter for counting the number of character patterns read from the character generator, and wherein the display control means displays constituent elements of a message on the display section in a size depending on a character pattern count value obtained by the counter.

According to the third aspect of the present invention, in the radio paging receiver with a display unit according to any one of the first and second aspects, the character patterns are dot patterns, and the constituent elements of a message on the display section are constituted by dot display elements.

According to the present invention, the constituent elements of a message contained in a paging signal are constituted by dot display elements, the number of display elements is counted by the counter, and the constituent elements (unit display component) such as characters and numbers of the message are displayed on the display section in a size depending on the resultant value obtained from the counter. Therefore, when a long message is received, the constituent elements of the long message can be displayed on the display section in a small size; and when a short message is received, the constituent elements of the short message can be displayed on the display section in a large size.

As described above, according to the present invention, when a long message is received, the number of screen switching operations can be advantageously decreased; when a short message is received, the message can be displayed to be easily read.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 12 is a format for explaining a paging signal sent when a character of 2N×2M dots is displayed;

FIG. 13 is a format for explaining a paging signal sent when a character of N×M dots is displayed;

DETAILED DESCRIPTION OF THE PREFERRED EMBODIMENTS

The present invention will be described in more detail below with reference to the preferred embodiments shown in the accompanying drawings.

Figure 1:
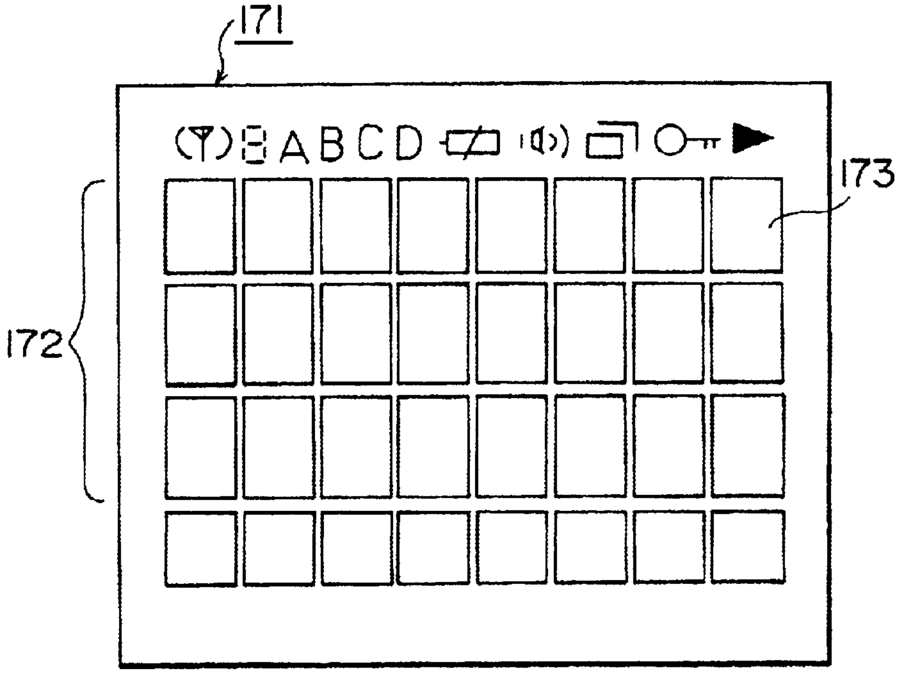
FIG. 1 PRIOR ART
FIG. 1 is a schematic plan view showing the arrangement of a liquid crystal display section of a prior art radio paging receiver with a display unit.
Figure 2:
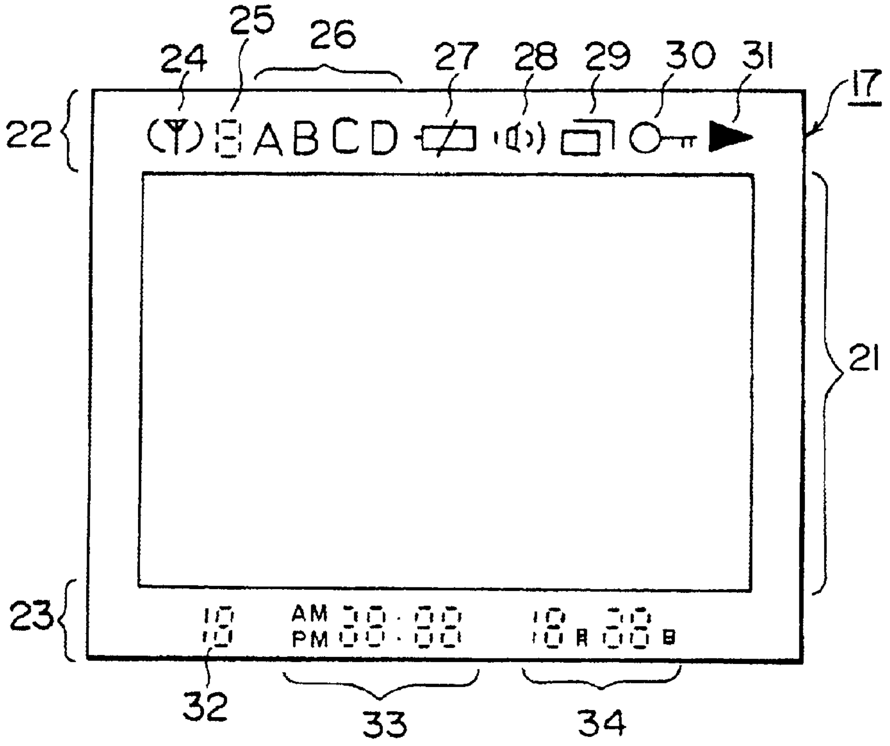
FIG. 2 is a schematic plan view showing the arrangement of a liquid crystal display section according to an embodiment of the present invention.

FIG. 2 is a schematic plan view showing the arrangement of a liquid crystal display section 17 in an embodiment of the present invention, and the liquid crystal display section 17 is constituted by a message display portion 21, a symbol display portion 22, and a time and date display portion 23.

The message display portion 21 is constituted by dot display elements and displays a message.

An off-boundary detection mark 24, a received address display mark 25, a received function display mark 26, a low-voltage display mark 27, a switch position display mark

28, an identical paging display mark 29, a message protection mark 30, and a next screen message continuous mark 31 are displayed on the symbol display portion 22.

Figure 3:
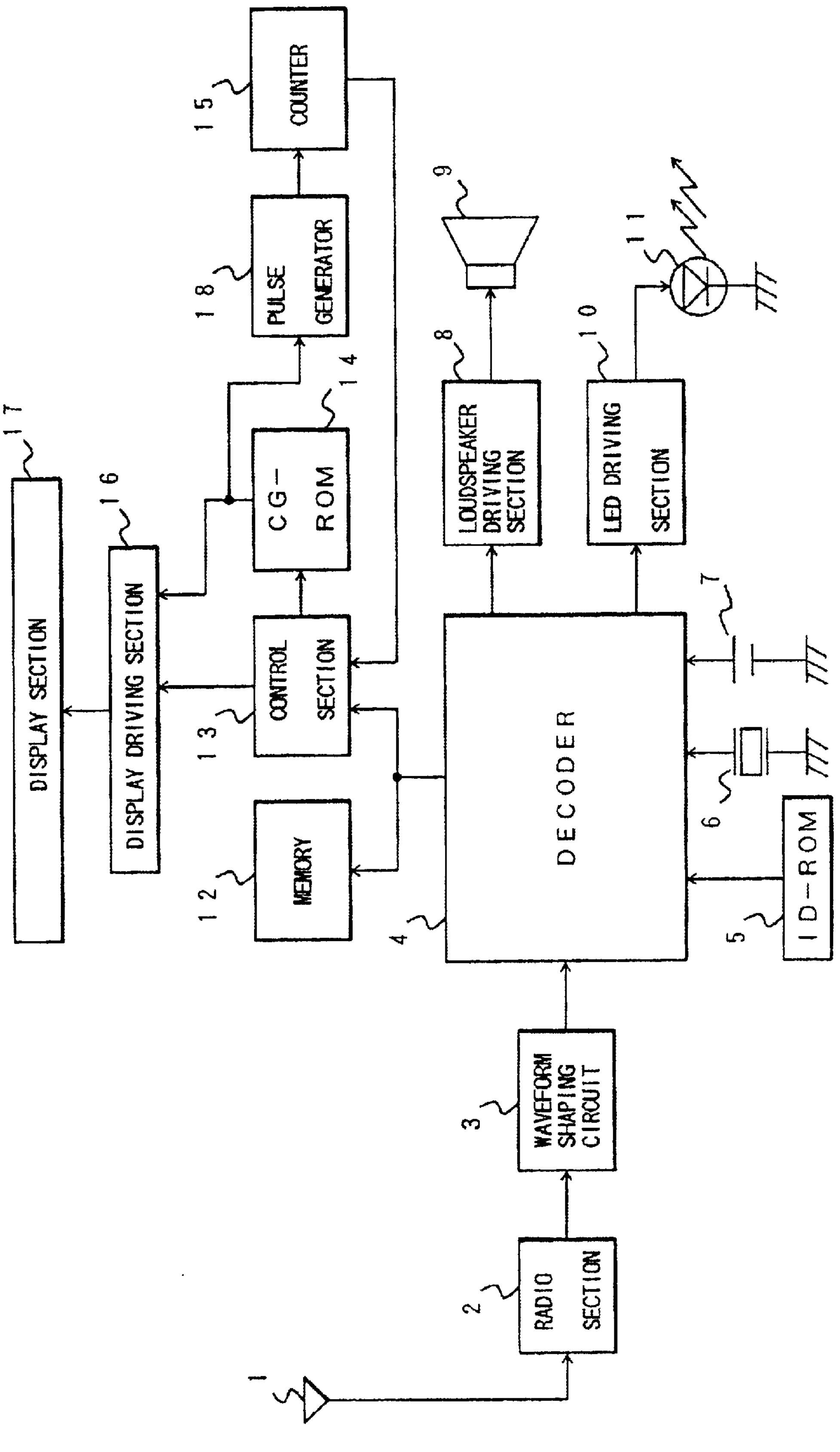
FIG. 3 is a block diagram showing the arrangement of the first embodiment of the present invention.

A message reception order 32, time 33, and date 34 are displayed on the time and date display section 23. FIG. 3 is a block diagram showing the arrangement of the first embodiment of the present invention, and a radio paging receiver according to the first embodiment is constituted by an antenna 1, a radio section 2, a waveform shaping circuit 3, a decoder 4, an ID-ROM 5, an oscillator 6, a power supply 7, a loudspeaker driving section 8, a loudspeaker 9, an LED driving section 10, a light-emitting diode 11, a memory 12, a control section 13, a character generator (CG-ROM) 14, a counter 15, a display driving section 16, a display section 17, and a pulse generator 18.

Figure 4:
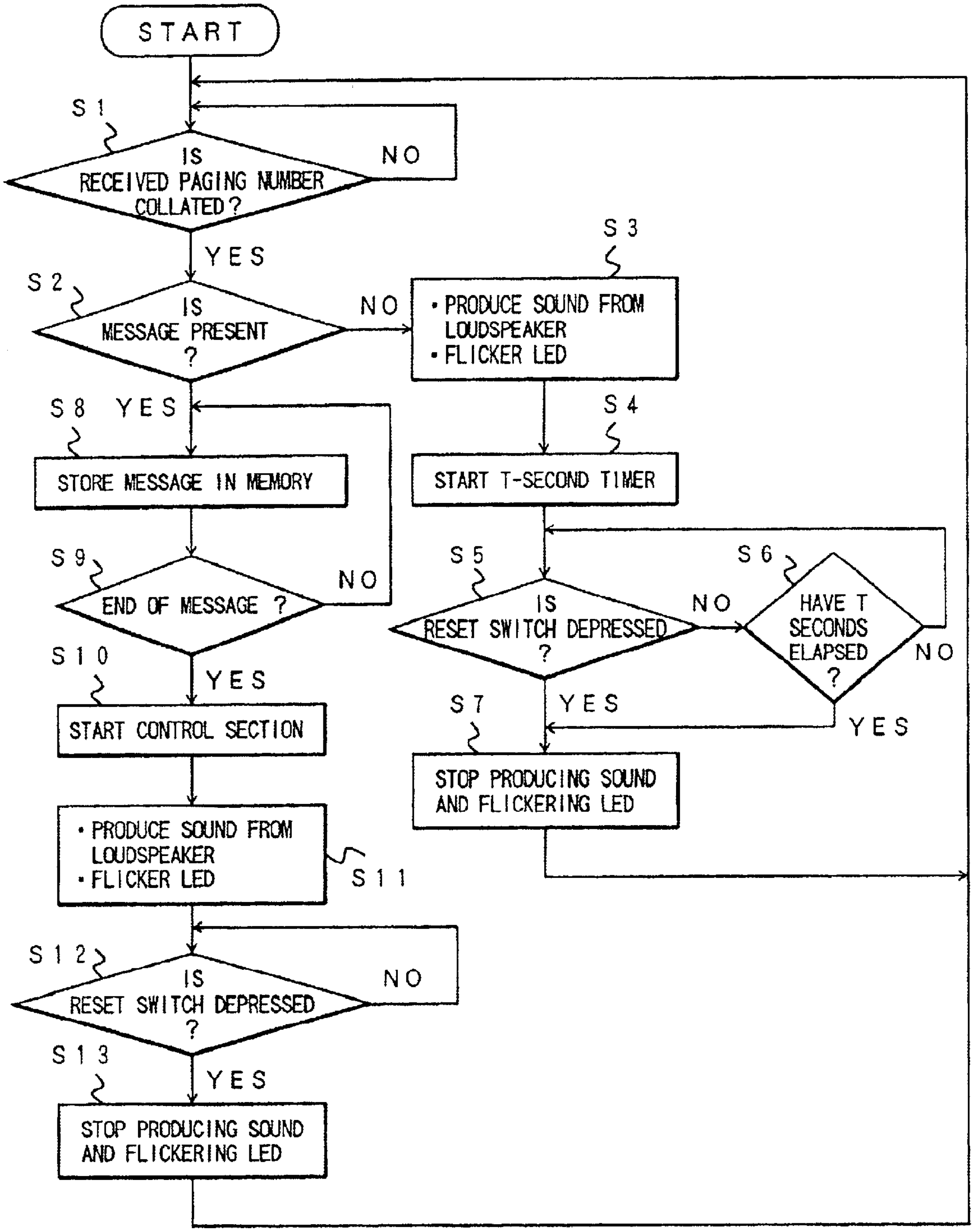
FIG. 4 is a flow-chart showing processing of a decoder used in the first embodiment.
Figure 5:
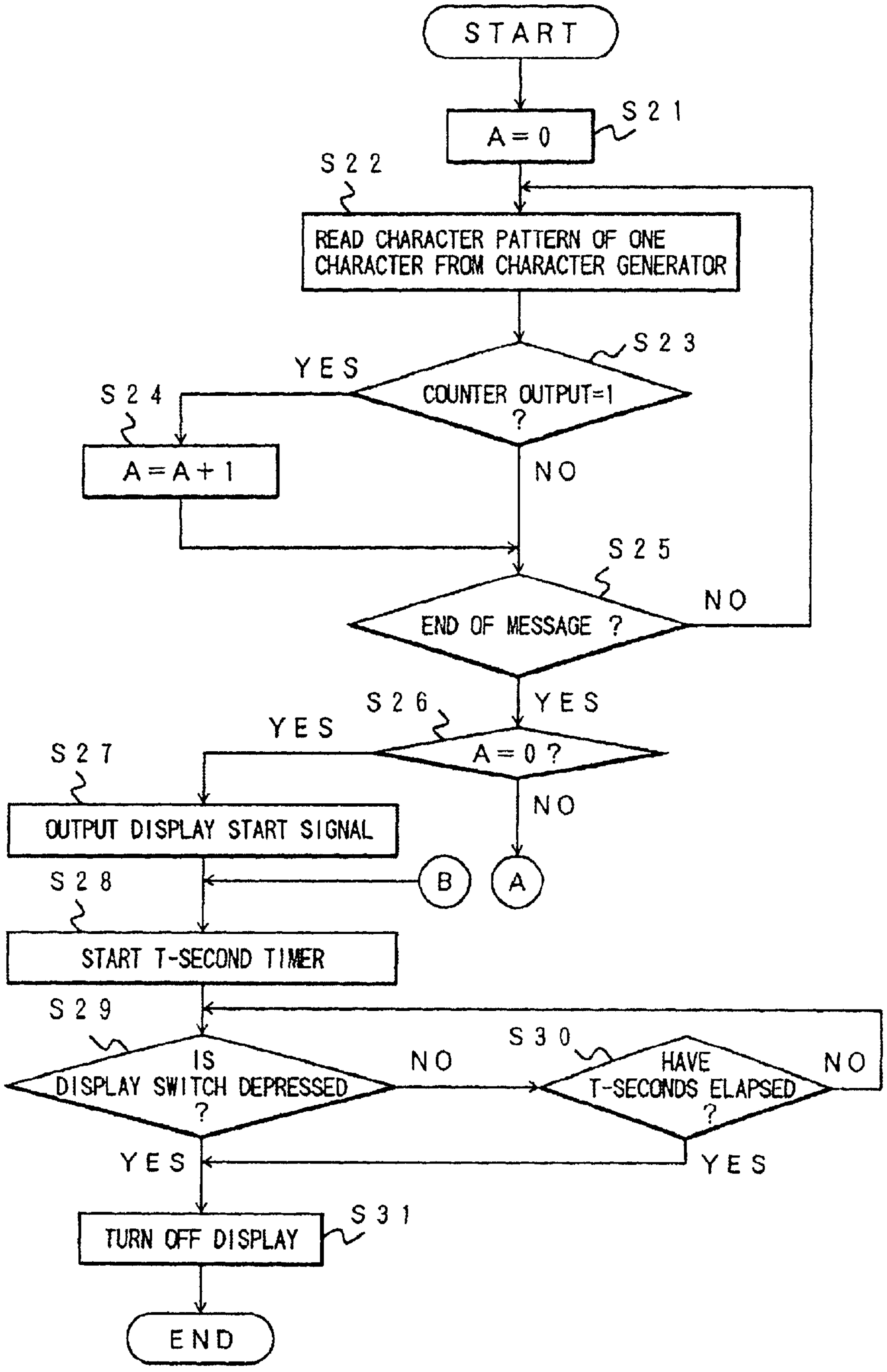
FIG. 5 is a flow-chart showing processing of a control section used in the first embodiment.
Figure 6:
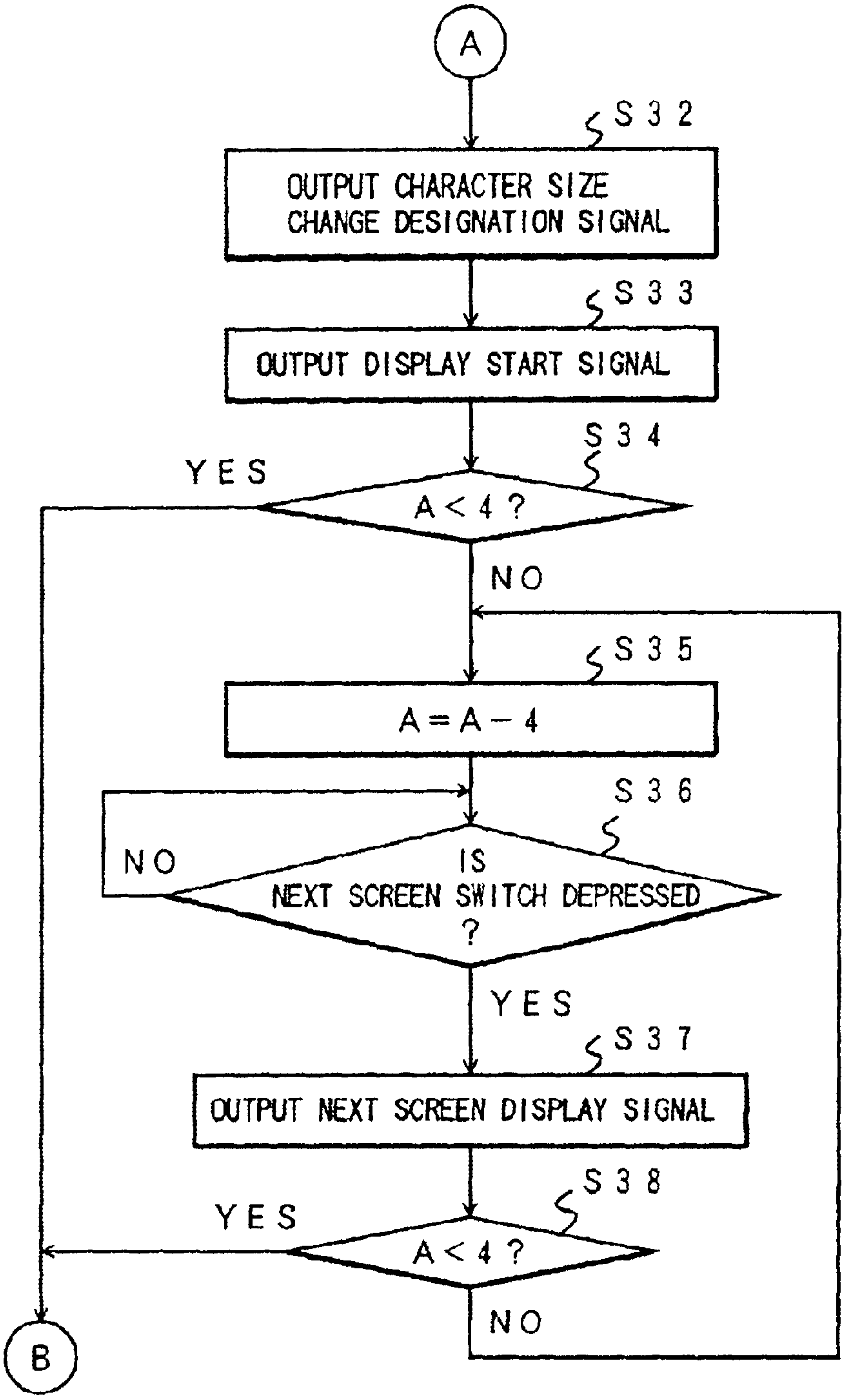
FIG. 6 is a flow-chart as a continuation of the flow chart shown in FIG. 5.

FIG. 4 is a flow chart showing processing of the decoder 4, and FIGS. 5 and 6 are flow charts showing processing of the control section 13. An operation of this embodiment will be described below with reference to FIGS. 4, 5, and 6.

A paging signal received by the antenna 1 is amplified and demodulated by the radio section 2, and then converted into a signal, which can be read by the decoder 4, in the waveform shaping circuit 3.

When the decoder 4 receives the paging signal having the waveform shaped by the waveform shaping circuit 3, as shown in FIG. 4, a paging number contained in the signal is collated with a self-paging number stored in the ID-ROM 5 (step S1).

When the numbers do not coincide with each other (NO in step S1), the decoder 4 waits for a next paging signal. When the numbers coincide with each other (YES in step S1), it is checked whether a message following the paging number is present (step S2).

When it is determined in step S2 that a message is not present (NO in step S2), a drive signal is supplied to the loudspeaker driving section 8 and the LED driving section 10 to drive the loudspeaker 9 and the light-emitting diode 11 so as to notify a user of being paged (step S3).

The decoder 4 starts a T-second timer (step S4). When the timer is turned off, or a reset switch (not shown) is depressed by the user, the operations of the loudspeaker 9 and the light-emitting diode 11 are ended (steps S5 to S7).

When it is determined in step S2 that a message is present (YES in step S2), the decoder 4 stores the message in the memory 12 (step S8). When all messages are stored in the memory 12 (YES in step S9), the control section 13 is started (step S10).

Thereafter, the decoder 4 supplies a drive signal to the loudspeaker driving section 8 and the LED driving section 10 to drive the loudspeaker 9 and the light-emitting diode 11 so as to notify the user of being paged (step S11). When the user depresses the reset switch in response to the notifying operation (YES in step S12), the decoder 4 ends the operations of the loudspeaker 9 and the light-emitting diode 11 (step S13).

Figure 8:
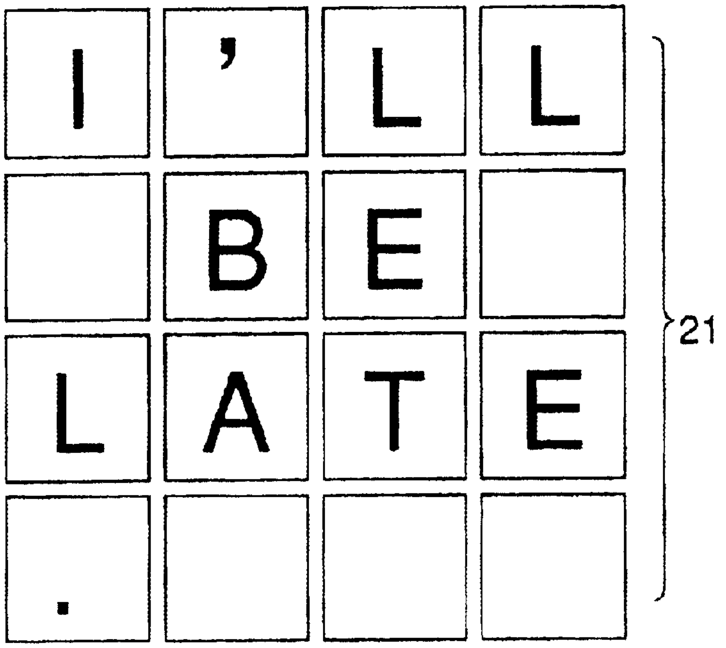
FIG. 8 is a view for explaining a display sample obtained when a short message is received in the first embodiment.

When the control section 13 is started by the decoder 4, as shown in the flow chart of FIG. 5, a count value A is set to be "0" first (step S21). Thereafter, the control section 13 reads out one character of a message stored in the memory 12, and a character pattern (2N×2M dot pattern; the pattern has a size to display sixteen patterns on the display section 17 as shown in FIG. 8) corresponding to the read character is read out from the character generator 14 (step S22). The control section 13 repetitively performs the above processing until YES in step S25, i.e., until character patterns corresponding to all the characters of each message stored in the memory 12 are completely read out from the character generator 14.

Figure 7:
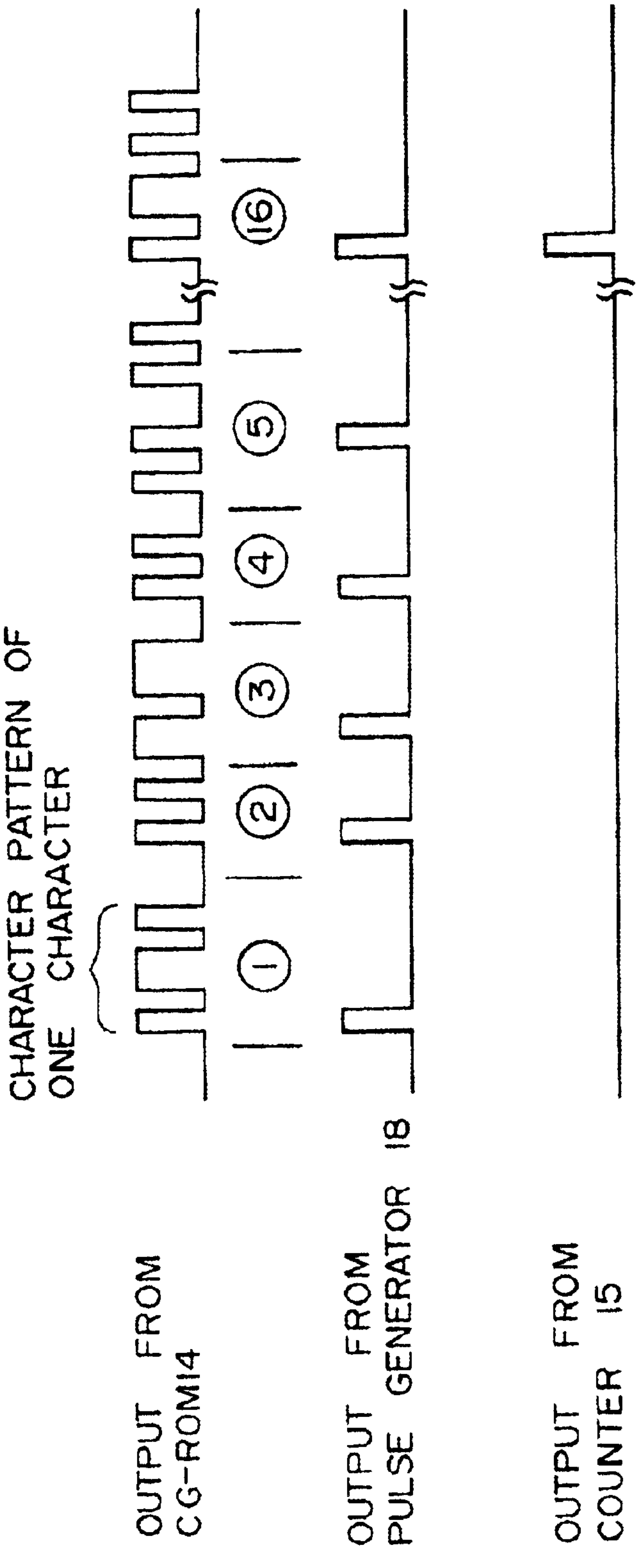
FIG. 7 is a timing-chart showing an operation of the first embodiment.

The character patterns read out from the character generator 14 are supplied to the display driving section 16 and the pulse generator 18. The display driving section 16 holds the character patterns from the character generator 14, and the pulse generator 18, as shown in FIG. 7, outputs a pulse every time a character pattern of one character is output from the character generator 14. The number of pulses output from the pulse generator 18 is counted by the counter 15, and the counter 15 outputs a pulse to the control section 13 every time sixteen pulses from the pulse generator 18 are counted.

When the control section 13 receives a pulse from the counter 15 while reading character patterns from the character generator 14, a counter value A is incremented by one (steps S23 and S24).

When character patterns corresponding to all characters of each message stored in the memory 12 are read from the character generator 14 (YES in step S25), the control section 13 checks whether the count value "A" is set to be "0", i.e., whether the length of the message has less than sixteen characters (step S26).

When it is determined that the length of the message has less than sixteen characters (YES in step S26), the control section 13 immediately outputs a display start signal to the display driving section 16 (step S27). Otherwise (NO in step S26), the control section 13 outputs a character size change designation signal to the display driving section 16 (step S32), and then outputs a display start signal to the display driving section 16 (step S33).

When the display driving section 16 receives the display start signal without receiving the character size change designation signal (YES in step S26), a segment signal is formed in accordance with character patterns (character patterns each having 2N×2M dots) corresponding to the message stored in the memory 12, the resultant segment signal is output to the display section 17, and the message is displayed on the display section 17. FIG. 8 is a view showing a display sample obtained in this case.

Figure 9:
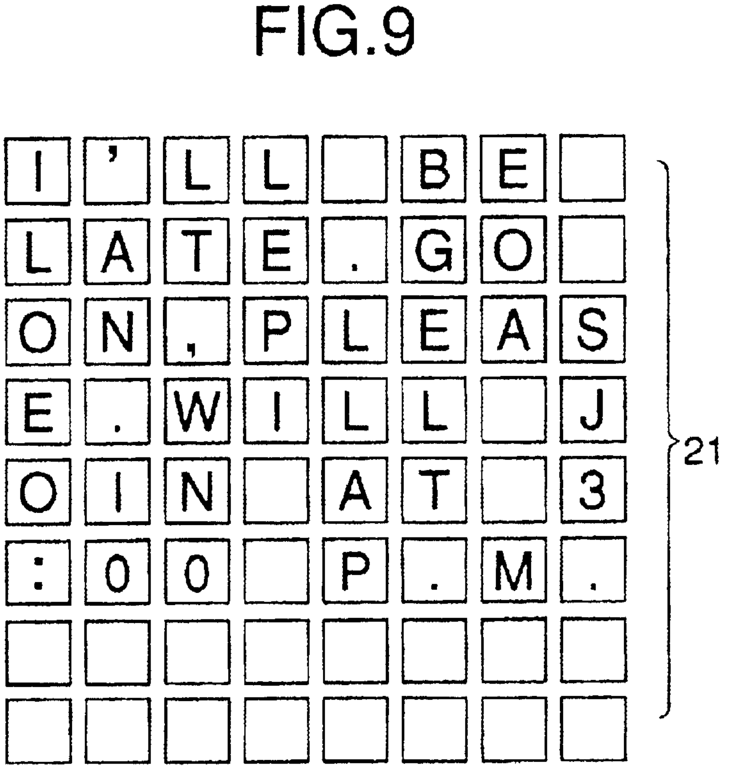
FIG. 9 is a view for explaining a display sample obtained when a long message is received in the first embodiment.

When the display driving section 16 receives the display start signal after the display driving section 16 receives the character size change designation signal (NO in step S26), a segment signal is formed in accordance with character patterns each having N×M dots and each formed by thinning, e.g., even-numbered columns and even-numbered rows, from a corresponding one of the character patterns corresponding to the stored message. The resultant segment signal is output to the display section 17 to display the message on the display section 17. FIG. 9 is a view showing a display sample obtained in this case. Since a display operation is performed in accordance with the segment signal formed on the basis of character patterns each having N×M dots, the size of each character is ¼ that of the message display portion in FIG. 8, and the number of characters which can be displayed on the message display portion in FIG. 9 is four times that on the message display portion in FIG. 8, i.e., sixty-four characters can be displayed on the display portion in FIG. 9.

When the control section 13 outputs the display start signal in step S27, a T-second timer is started (step S28). When the timer is turned off, or an operator depresses a display switch (not shown), the control section 13 instructs the display driving section 16 to turn off the display so as to end the display of the message (steps S29 to S31).

When the display start signal is output in step S33, the control section 13 checks whether the count value "A" satisfies A<4, i.e., whether the length of a message has less than sixty-four characters (step S34).

When it is determined that the number of characters of the message is smaller than sixty-four (YES in step S34), processing in step S28 is performed. When the number is not smaller than sixty-four, i.e., when a next screen is present (NO in step 34), after "4" is subtracted from the count value (step S35), the control section 13 waits for depression of a next screen switch (not shown) (step S36).

When the next screen switch is depressed, the control section 13 outputs a next screen display signal to the display driving section 16 (step S37), and the control section 13 checks whether the count value "A" satisfies A<4, i.e., whether a next screen is present, (step S38). When it is determined that the next screen is not present (YES in step S38), processing in step S28 is performed. When it is determined that the next screen is present (NO in step S38), processing in step S35 is performed again.

When the display driving section 16 receives the next screen display signal, the display driving section 16 forms a segment signal for displaying a message (which is to be displayed) on the display section 17 by characters each having a size of N×M dots. The resultant segment signal is supplied to the display section 17 to display the message (which is to be displayed) on the display section 17 using characters each having N×M dots.

Figure 10:
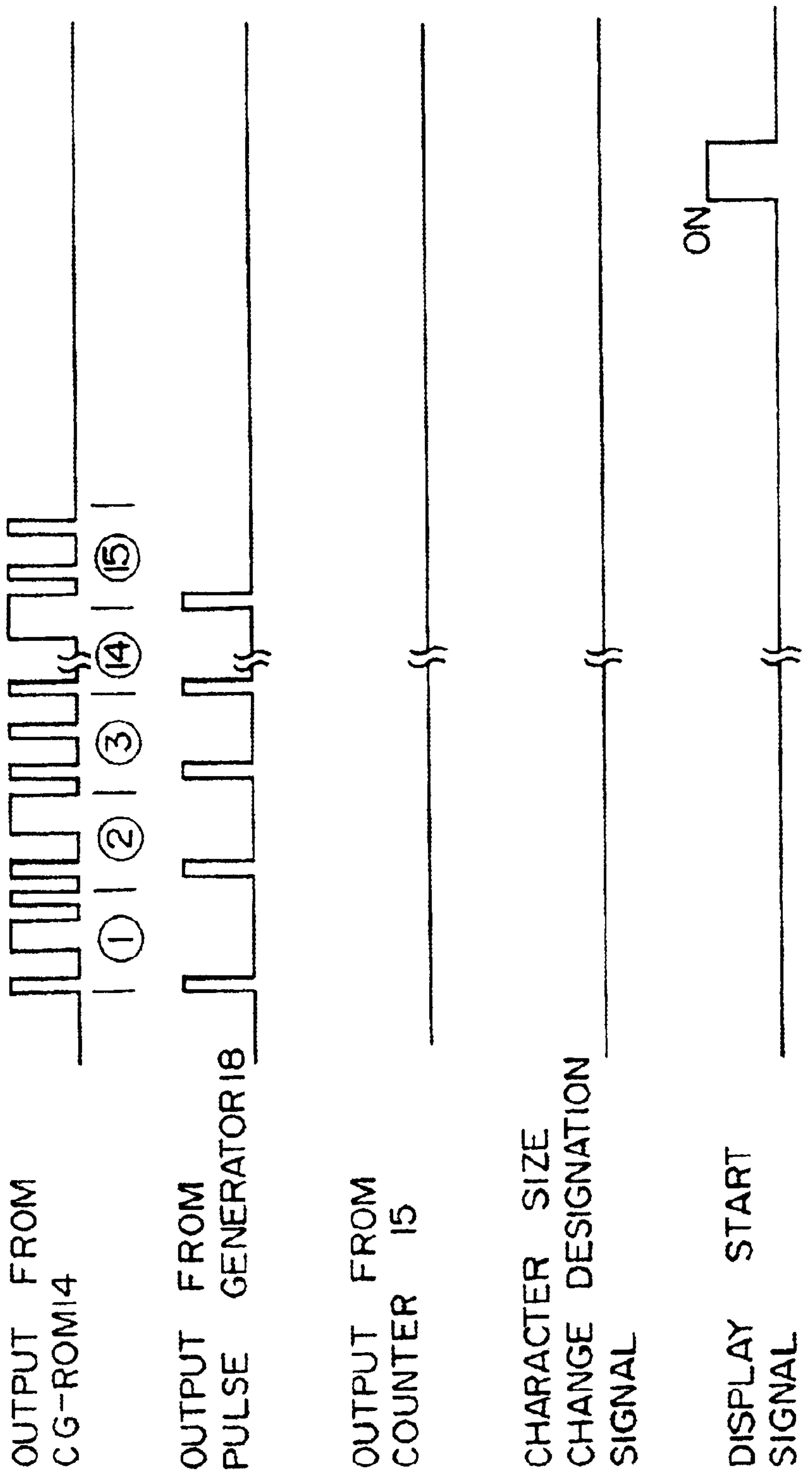
FIG. 10 is a timing-chart showing an operation of the first embodiment when a short message is received.
Figure 11:
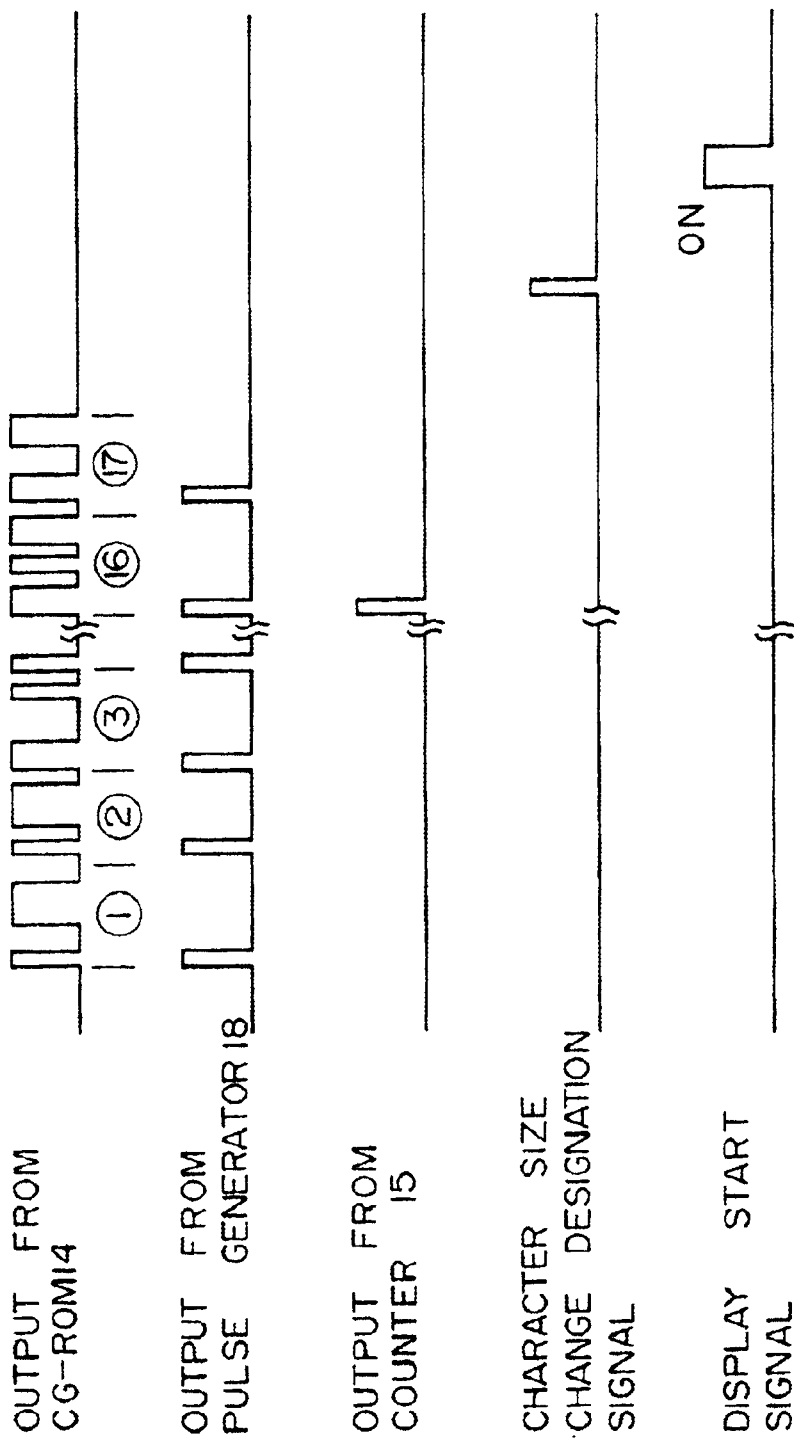
FIG. 11 is a timing-chart showing an operation of the first embodiment when a long message is received.

FIG. 10 is a timing chart showing an operation performed when the length of a message has less than sixteen characters, and FIG. 11 is a timing chart showing an operation performed when the length of a message has sixteen or more characters.

A pulse is output from the pulse generator 18 every time a character pattern of one character is output from the character generator 14. When the length of a message has less than sixteen characters, since no pulse is output from the counter 15, no character size change designation signal is output from the control section 13 to the display driving section 16, as shown in FIG. 10. As a result, the message is displayed by characters each having 2N×2M dots.

In contrast to this, when the length of a message has sixteen or more characters, as shown in FIG. 11, a pulse is output from the counter 15 when sixteen pulses are output from the pulse generator 18. As a result, when the number of characters of the message is sixteen or more, a character size change designation signal is output from the control section 13 to the display driving section 16, and the message is displayed by characters each having N×M dots.

In the above-described embodiment, the length of a message is determined on the basis of the number of character patterns read from the character generator 14, and a switching operation between display of a message using characters each having 2N×2M dots and display of a message using characters each having N×M dots is performed on the basis of the determination result. In addition, a character size switch which can be operated by a user may be arranged on the radio paging receiver with a display unit, so that the size of each character to be displayed may be switched in accordance with the state of this switch.

Figures 12, 13:
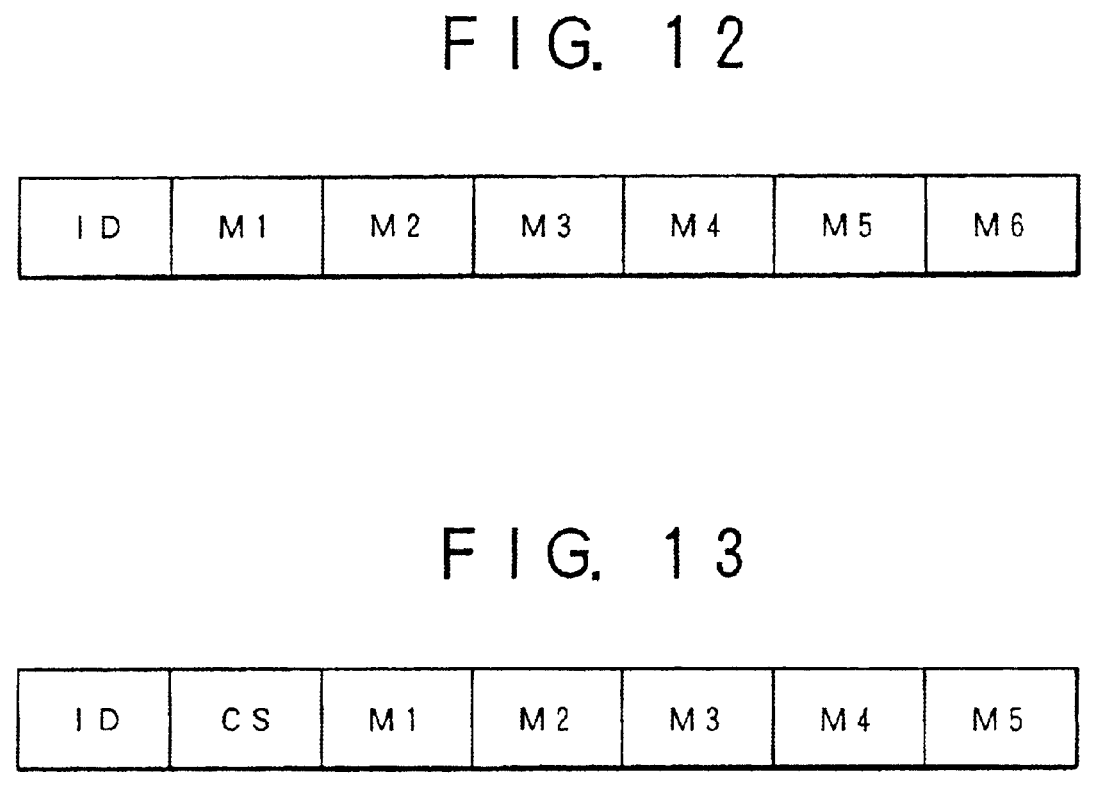

When messages are to be displayed by characters each having 2N×2M dots, as shown in FIG. 12, a paging signal constituted by a paging number ID and messages M1 to M6 is sent. When messages are to be displayed by characters each having N×M dots, as shown in FIG. 13, a paging signal constituted by a paging number ID, a control signal CS, messages M1 to M5 is sent. In this manner, a switching operation between display of the messages using characters each having 2N×2M dots and display of messages using characters each having N×M dots can be performed depending on the presence/absence of the control signal CS in a radio paging receiver with a display unit.

In the above embodiment, although a pulse is output from the pulse generator 18 every time a character pattern of one character is output from the character generator 14, a pulse can be output from the pulse generator 18 every time the control section 13 reads one character of a message from the memory 12.

Figure 14:
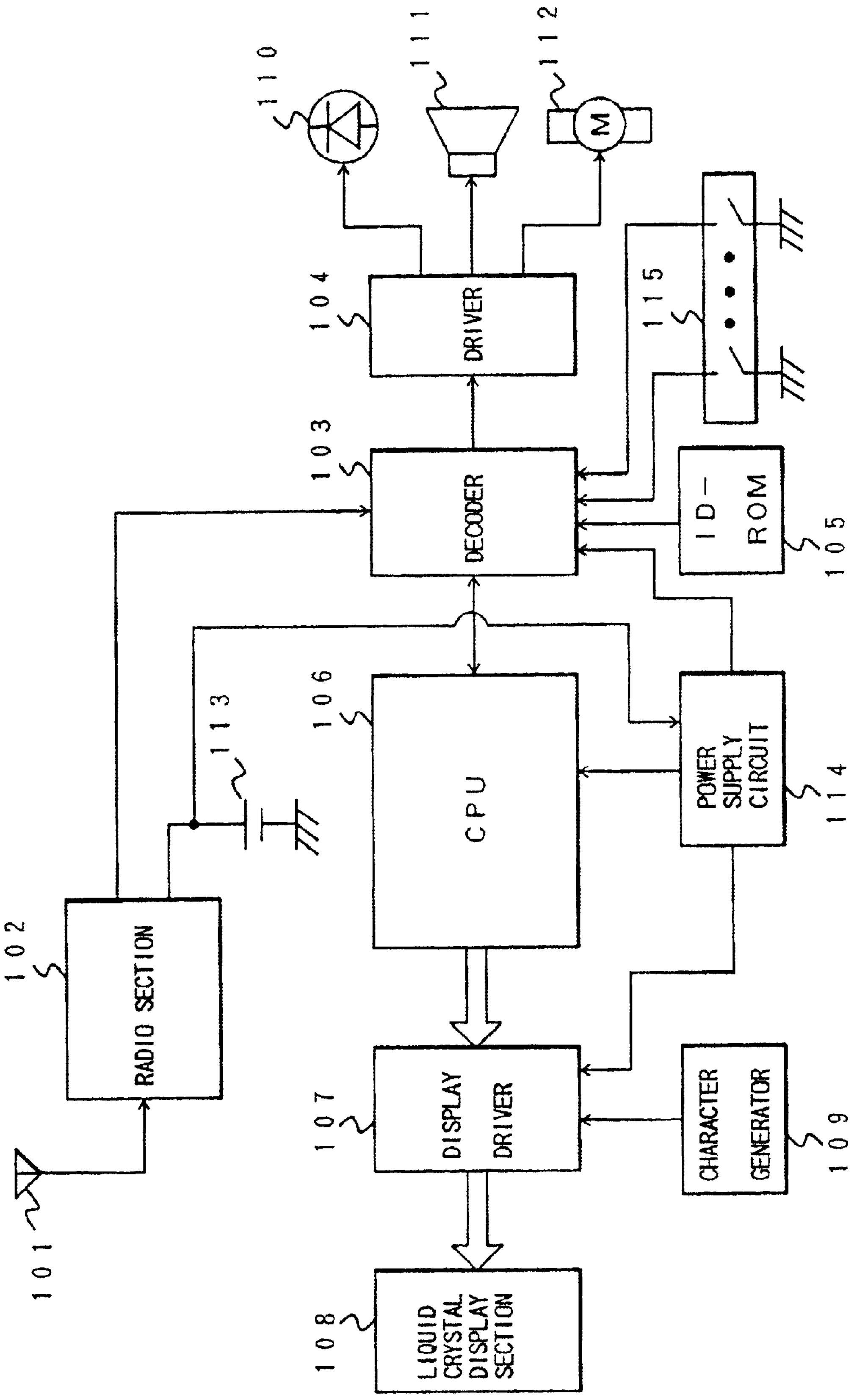
FIG. 14 is a block diagram showing the second embodiment of the present invention.
Figure 15:
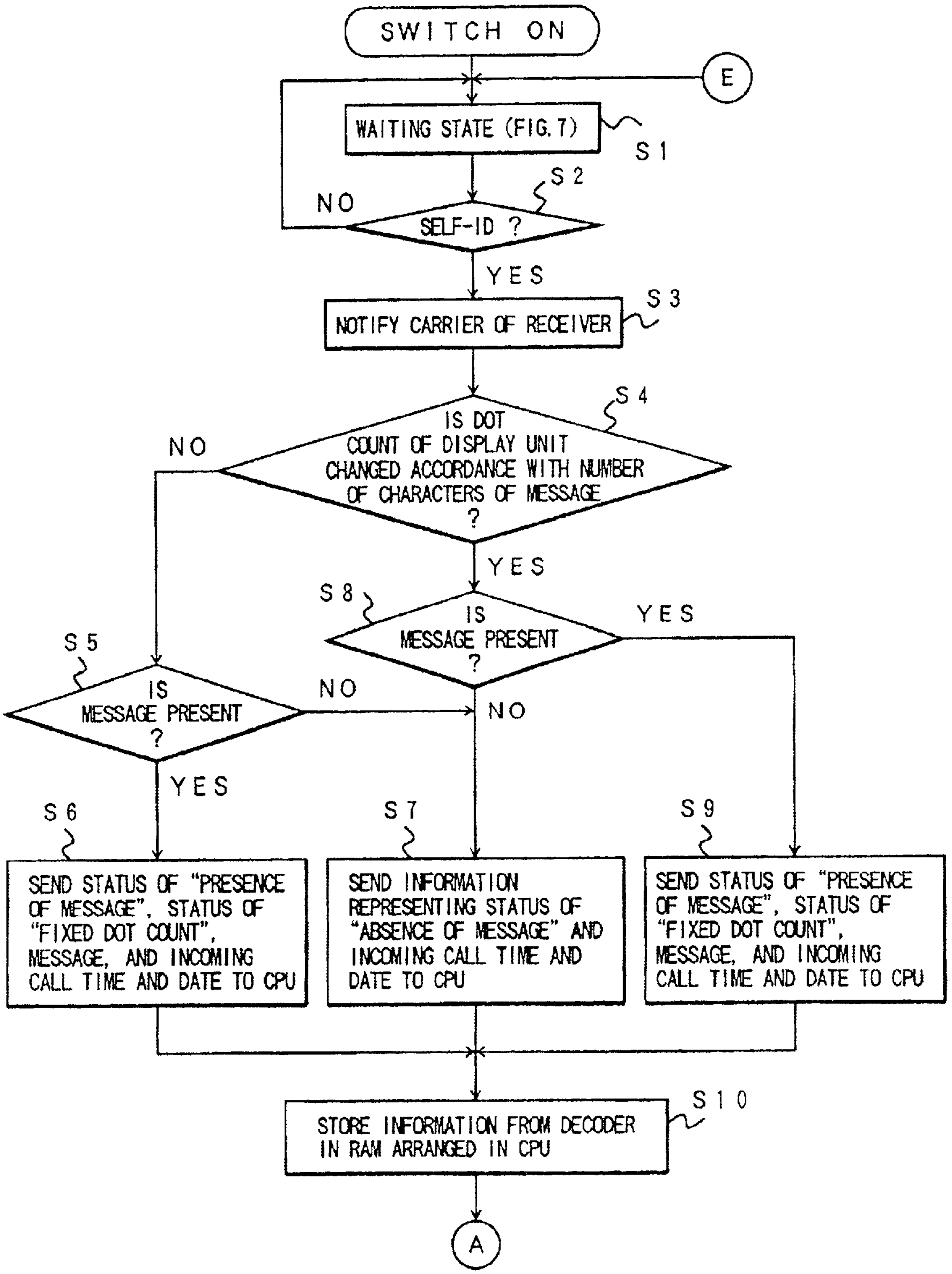
FIG. 15 is a flow-chart showing processing of a control section used in the second embodiment.
Figure 16:
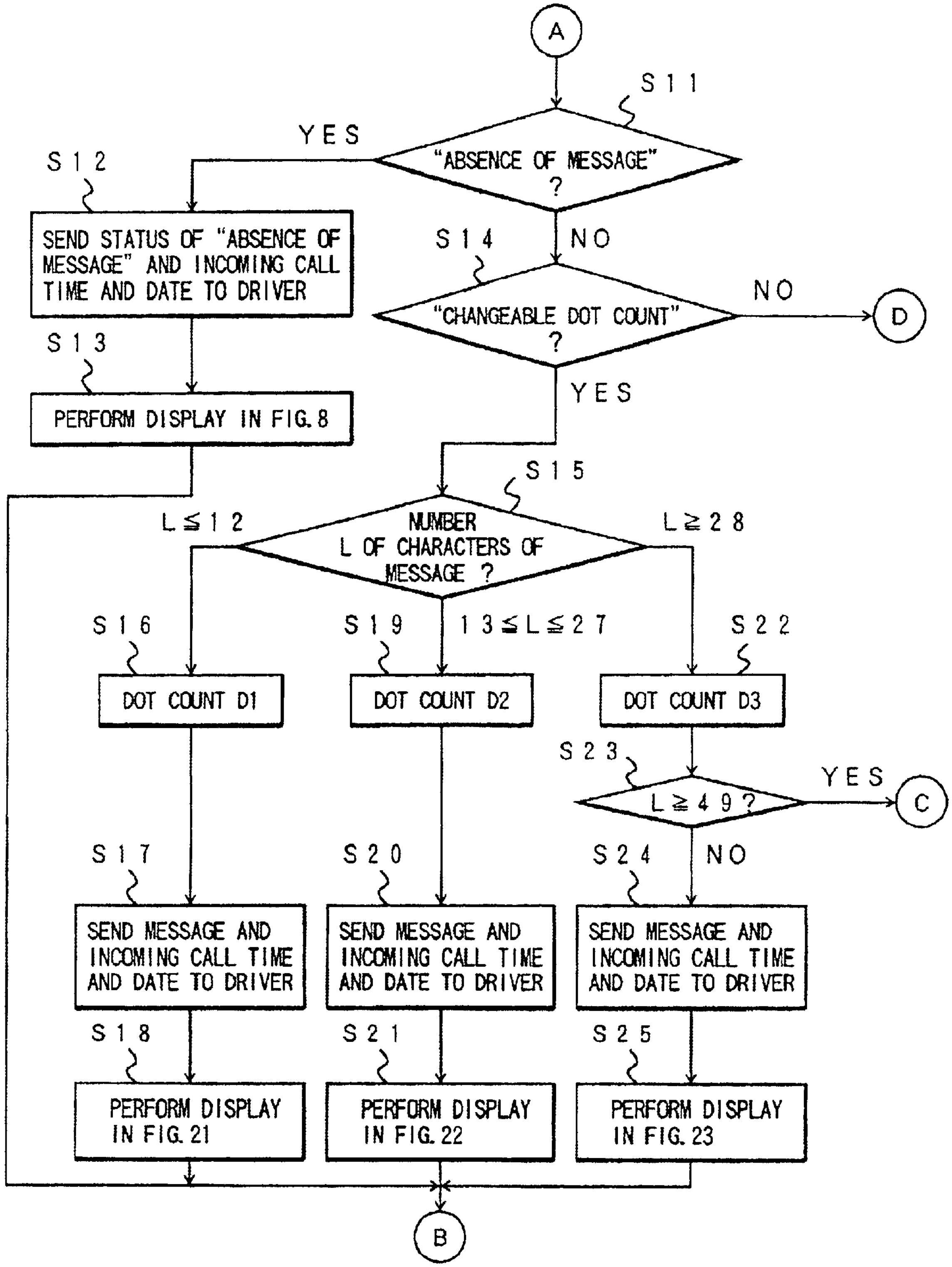
FIGS. 16 to 18 are flow-charts as continuations of to the flow chart showing in FIG. 15.
Figure 17:
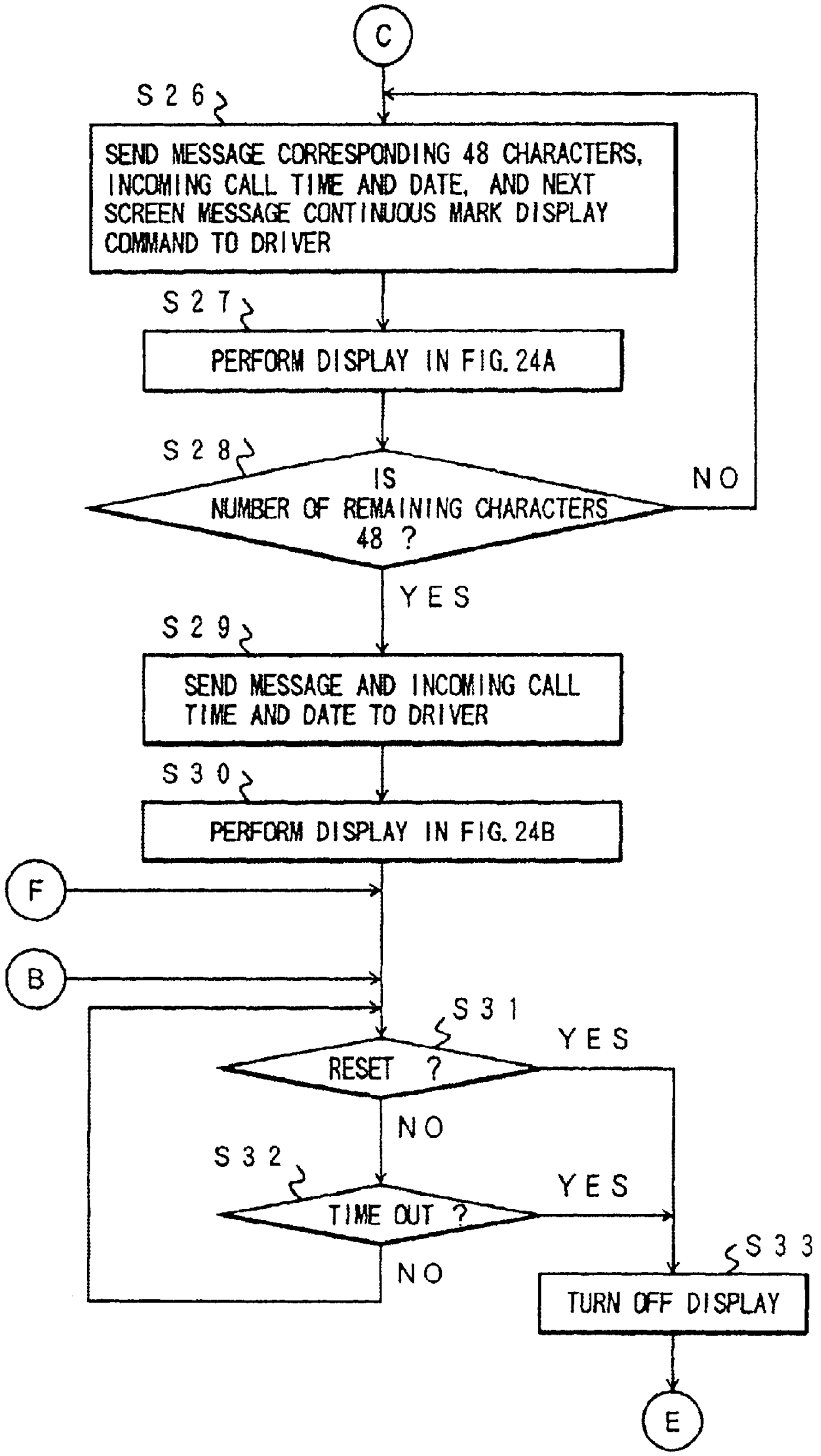
Figure 18:
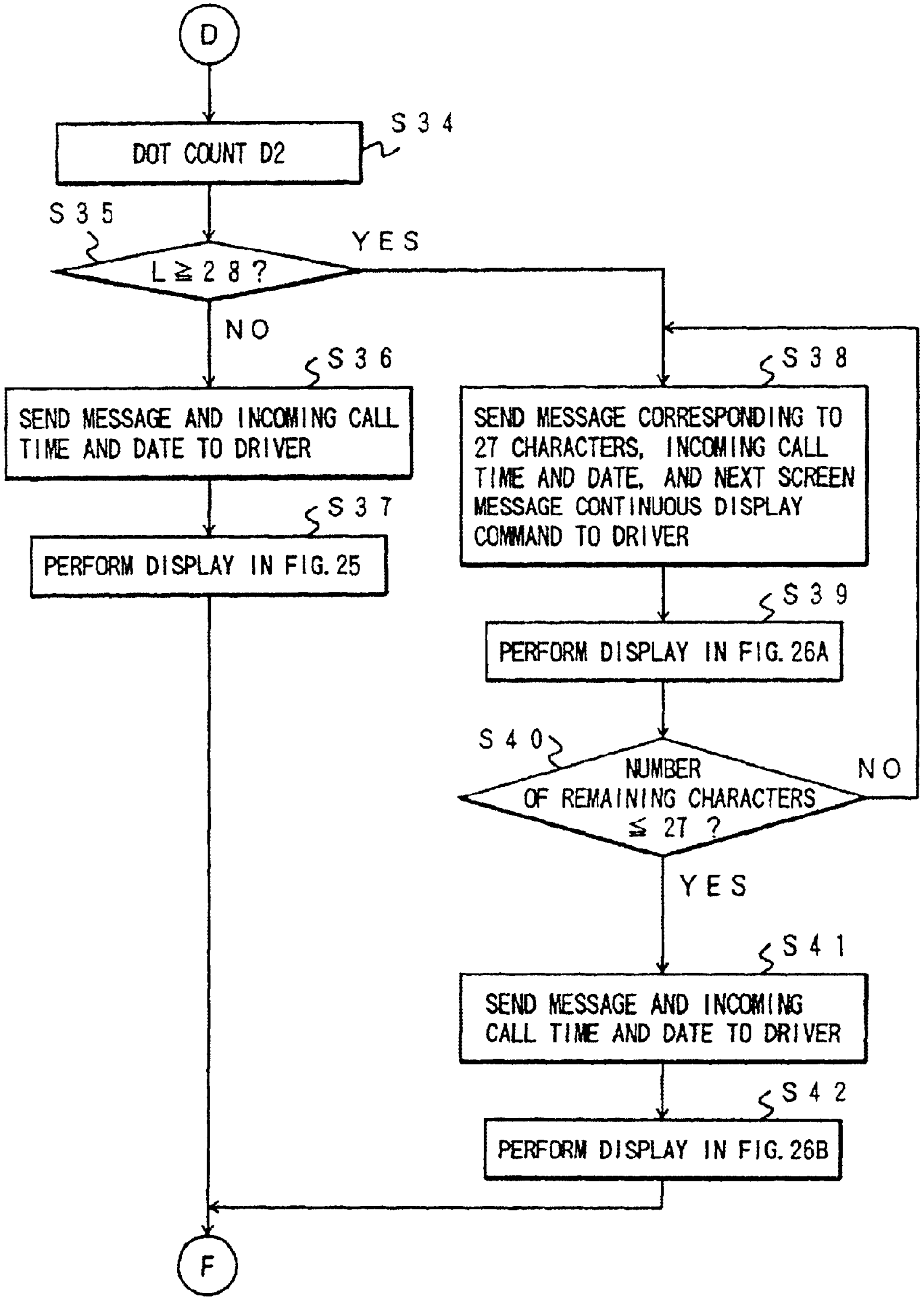

Subsequently, the second embodiment of the present invention will be described with reference to FIGS. 14 to 26B. FIG. 14 is a block diagram showing the arrangement of the second embodiment of the present invention. A receiver according to the second embodiment is constituted by an antenna 101, a radio section 102, a decoder 103, a light-emitting diode 110, a loudspeaker 111, a driver 104 for driving a vibrator 112, an ID-ROM 105, a CPU 106, a display driver 107 for driving a liquid crystal display section 108, a character generator 109, a power supply 113, a power supply circuit 114, and switches 115. The switches 115 include a power supply switch, a notifying means driving switch for designating whether the light-emitting diode 110, the loudspeaker 111, and the vibrator 112 are driven, a dot count change switch for designating whether the dot count of a display unit to be displayed on the liquid crystal display section 108 is changed in accordance with the number of characters of a message, a next screen display switch for designating that a displayed screen is changed into a next screen, and a display erasing switch depressed when a message displayed on the liquid crystal display section 108 is to be erased. Display data of three sizes for each character are stored in the character generator 109.

FIGS. 15 to 18 are flow charts showing processing of the radio paging receiver with a display unit shown in FIG. 14, and an operation of the second embodiment will be described below.

Figure 19:
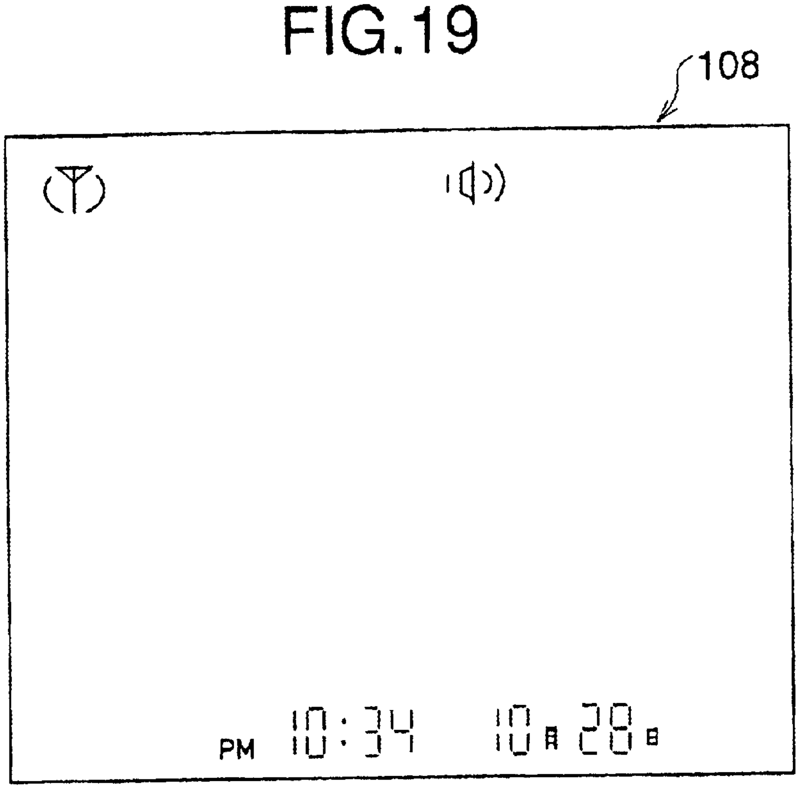
FIG. 19 is a plan view showing a liquid crystal display section serving as a waiting screen.

The radio paging receiver with a display unit shown in FIG. 14 is set in a waiting state by turning on the power switch of the switches 115 so as to display a waiting screen shown in FIG. 19 on the liquid crystal display section 108 (step S1). On this waiting screen, as shown in FIG. 19, current time and date are displayed.

The radio section 102 amplifies and demodulates a paging signal containing a message and received through the antenna 101 to supply the demodulated signal to the decoder 103.

When the radio paging receiver set in the waiting state receives the demodulated signal from the radio section 102, the decoder 103 checks whether the address of an address signal in the demodulated signal coincides with a self-paging address stored in the ID-ROM 105 (step S2).

When it is determined that the addresses do not coincide with each other (NO in step S2), the flow returns to the waiting state in step S1.

When it is determined that the addresses coincide with each other (YES in step S2), a driving signal is supplied, through the driver 104, to any one of the light-emitting diode 110, the loudspeaker 111, and the vibrator 112 which is designated to be driven by the notifying means driving switch of the switches 115, so that the light-emitting diode 110, the loudspeaker 111, or vibrator 112 notifies a user of being paged (step S3).

Thereafter, the decoder 103 checks whether a state of the dot count change switch of the switches 115 which designates whether the number of dots of a display unit is changed in accordance with the number of characters of a message is set to be "changeable dot count" or "fixed dot count" (step S4).

When it is determined that the state of the dot count change switch is set to be "fixed dot count" (NO in step S4), the decoder 103 checks whether a paging signal sent from the radio section 102 contains a message (step S5).

When it is determined that the paging signal contains the message (YES in step S5), the decoder 103 sends a status of "presence of message", a status of "fixed dot count", incoming call time and date, and the message itself to the CPU 106 (step S6). When it is determined that the paging signal does not contain a message (NO in step S5), the decoder 103 sends a status of "absence of message" and the incoming call time and date to the CPU 106 (step S7). Note that the decoder 103 has a time calculating function and a calendar calculating function, and incoming call time and date are determined by these functions.

When it is determined in step S4 that the state of the dot count change switch is set to be "changeable dot count" (YES in step S4), the decoder 103 checks whether the paging signal sent from the radio section 102 contains a message (step S8).

When it is determined that the paging signal does not contain a message (NO in step S8), processing in step S7 is performed. When it is determined that the paging signal contains a message (YES in step S8), the decoder 103 sends a status of "presence of message", a status of "changeable dot count", incoming call time and date, and the message itself to the CPU 106 (step S9).

When the CPU 106 receives a message and various statuses from the decoder 103, the CPU 106 stores the message and statuses in a RAM (not shown) arranged in the CPU 106 (step S10).

Thereafter, the CPU 106 checks whether a status indicating the presence/absence of the message stored in the RAM is set to be "absence of message" (step S11).

When it is determined that the status is set to be "absence of message" (YES in step S1), the CPU 106 sends the status of "absence of message" and the incoming call time and date to the display driver 107 (step S12).

Figure 20:
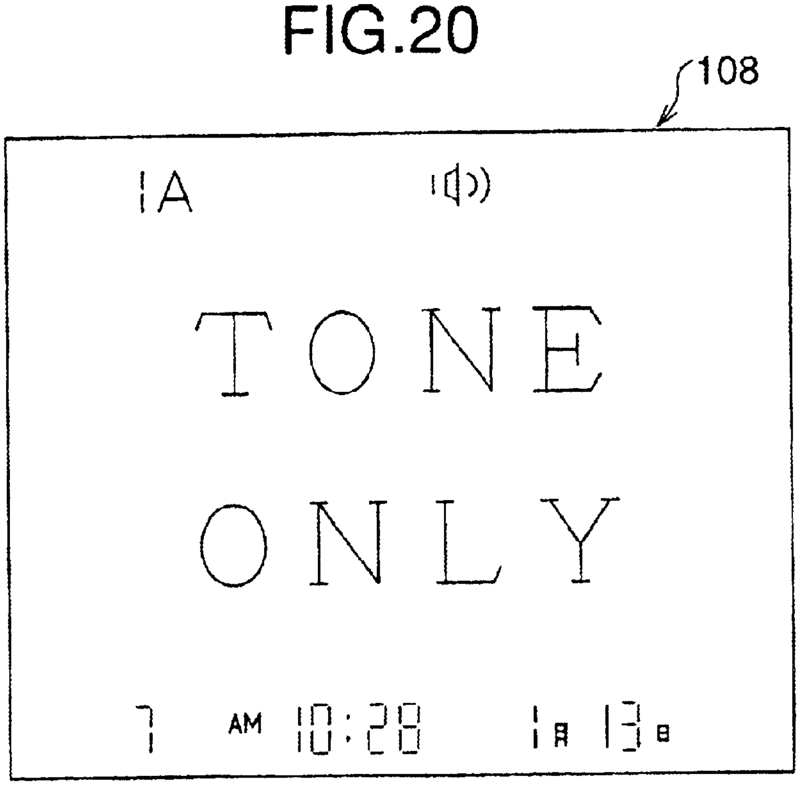
FIG. 20 is a view for explaining a display sample of the liquid crystal display section when no message is received.

The display driver 107 reads, from the character generator 109, display data "TONE ONLY" corresponding to the status of "absence of message" sent from the CPU 106, and the waveform of the display data is sent to the liquid crystal display section 108. A control signal for displaying the incoming call time and date sent from the CPU 106 is added to the liquid crystal display section 108, and the display contents of the liquid crystal display section 108 are shown in FIG. 20.

When it is determined that the status is set to be "presence of message" (NO in step S11), the CPU 106 checks whether a status indicating whether the dot count of a unit display component is changeable is set to be "changeable dot count" (step S14).

When it is determined that the status is set to be "changeable dot count" (YES in step S14), the CPU 106 calculates the number L of characters of a message stored in the RAM arranged in the CPU 106 (step S15).

When it is determined the number L of characters of the message satisfies L≦12, the CPU 106 sends, to the display driver 107, a status designating that the dot count of a unit display component is set to be D1 (step S16), and the CPU 106 sends the message and incoming call time and date to the display driver 107 (step S17).

Figure 21:
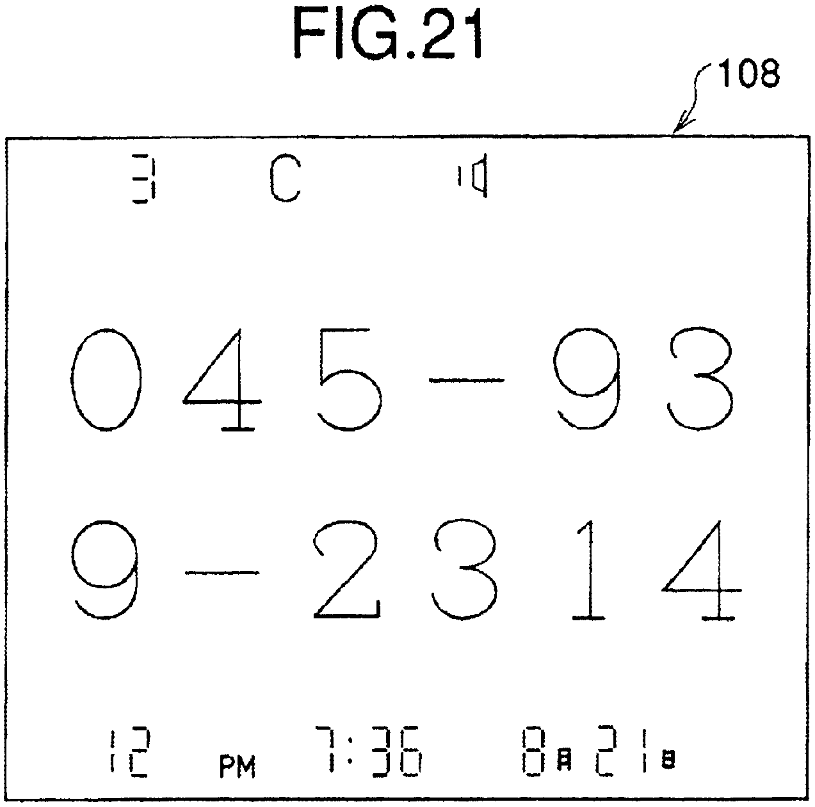
FIGS. 21 to 23, 24A, and 24B are views showing display samples of the liquid crystal display section when the dot count of each unit display component is changed in accordance with the number of characters of a message.

When the display driver 107 receives the status designating that the dot count of a unit display component is set to be D1, and then receives a message (e.g., "045-939-2314"), the display driver 107 reads display data corresponding to the message and the dot count D1 from the character generator 109 and supplies the display waveform of the display data to the liquid crystal display section 108. In addition, when the display driver 107 receives incoming call time and date, the display driver 107 supplies a control signal for displaying the incoming call time and date to the liquid crystal display section 108, and the displayed contents of the liquid crystal display section 108 are shown in FIG. 21 (step S18).

When it is determined in step S15 that the number L of characters of a message satisfies 13≦L≦27, the CPU 106 sends, to the display driver 107, a status designating that the dot count of a unit display component is set to be D2 (step S19), and the CPU 106 sends a message and incoming call time and date to the display driver 107 (step S20). Note that the dot count D2 is smaller than the dot count D1.

Figure 22:

When the display driver 107 receives the status designating that the dot count of a unit display component is set to be D2, and then receives a message (e.g., "Mr. Sato called you. Call him", the display driver 107 reads display data corresponding to the message and the dot count D2 from the character generator 109 and supplies the display waveform of the display data to the liquid crystal display section 108. In addition, when the display driver 107 receives incoming call time and date, the display driver 107 supplies a control signal for displaying the incoming call time and date to the liquid crystal display section 108, and the display contents of the liquid crystal display section 108 are shown in FIG. 22 (step S21).

When it is determined in step S15 that the number L of characters of the message satisfies L≧28, the CPU 106 sends, to the display driver 107, a status designating that the dot count of a unit display component is set to be D3 (step S22), and the CPU 106 checks whether the number L satisfies L≧49 (step S23). Note that the dot count D3 is smaller than the dot count D2.

When it is determined in step S23 that the number L satisfies L<49 (NO in step S23), the CPU 106 sends the message and the incoming call time and date to the display driver 107 (step S24).

Figure 23:
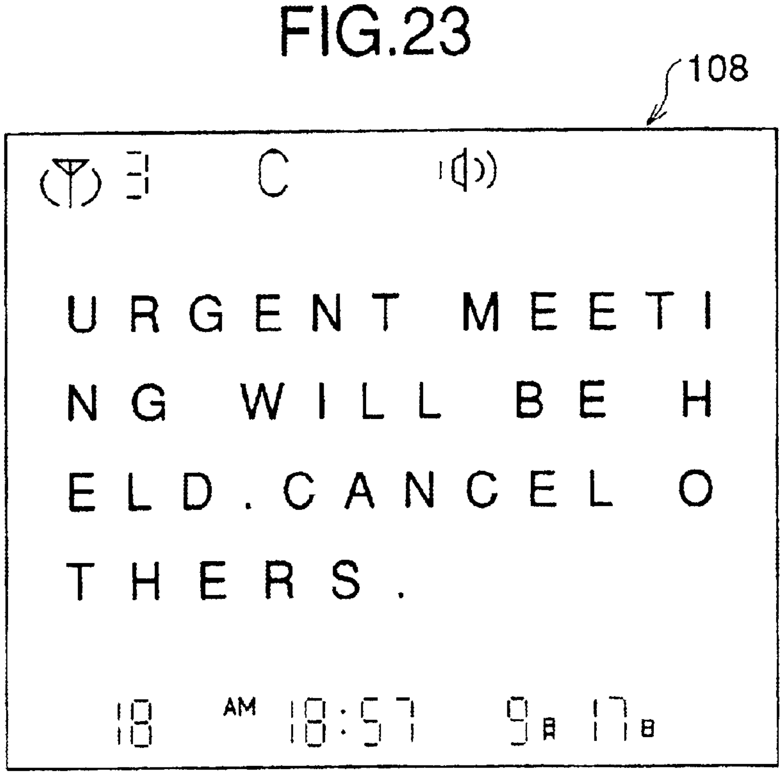

When the display driver 107 receives the status designating that the dot count of a unit display component is set to be D3, and thereafter receives a message (e.g., "Urgent meeting will be held. Cancel others."), the display driver 107 reads display data corresponding to the message and the dot count D3 from the character generator 109 and supplies the display waveform of the display data to the liquid crystal display section 108. In addition, when the display driver 107 receives incoming call time and date, the display driver 107 supplies a control signal for displaying the incoming call time and date to the liquid crystal display section 108, and the display contents of the liquid crystal display section 108 are shown in FIG. 23 (step S25).

When it is determined in step S23 that the number L of characters of the message satisfies L≧49, the CPU 106 sends the first forty-eight characters of a message (e.g., "Urgent meeting will be held. Cancel others and come back. We informed our client of it.") stored in the RAM in the CPU 106, the incoming call time and date, and a next screen message continuation mark display command to the display driver 107 (step S26).

Figure 24A:
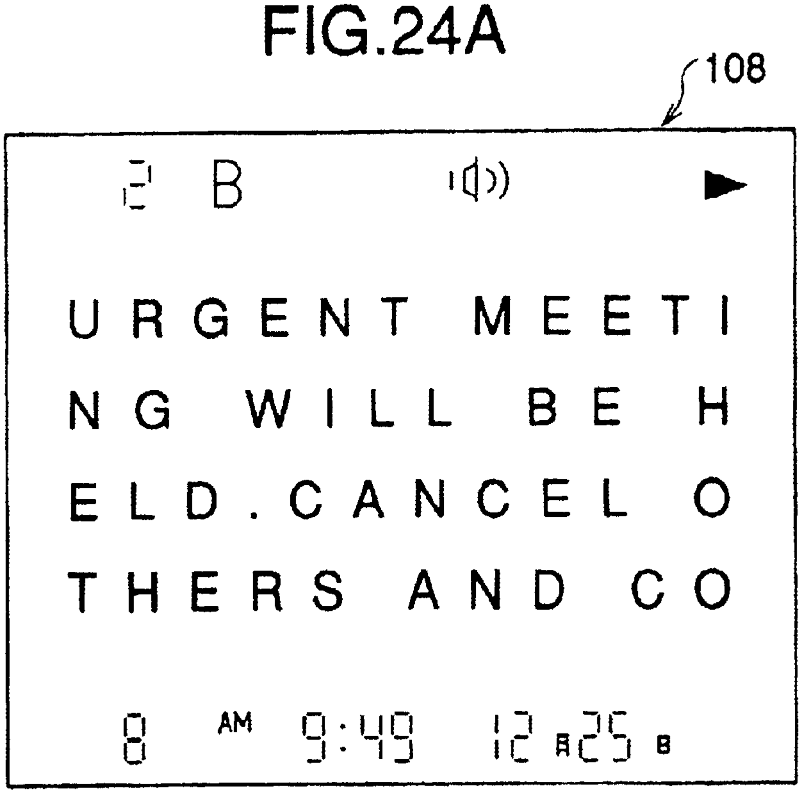

When the display driver 107 receives the message corresponding to the forty-eight characters, the display driver 107 reads display data corresponding to the message and the dot count D3 from the character generator 109 and supplies the display waveform of the display data to the liquid crystal display section 108. In addition, when the display driver 107 receives incoming call time and date and the next screen message continuous mark display command, the display driver 107 supplies, to the liquid crystal display section 108, a control signal for displaying the incoming call time and date and the next screen message continuous mark display, and the display contents of the liquid crystal display section 108 are shown in FIG. 24A (step S27).

Thereafter, the CPU 106 checks whether the number of remaining characters of the message is forty-eight or less (step S28).

When it is determined that the number of remaining characters is not forty-eight or less (NO in step S28), and the next screen display switch included in the switches 115 is operated, the flow returns to processing of step S26, and a message corresponding to the forty-eight characters is displayed on the liquid crystal display section 108.

When it is determined that the number of remaining characters is forty-eight or less (YES in step S28), and the next screen display switch of the switches 115 is operated, the remaining characters of the message and the incoming call time and date are sent to the display driver 107 (step S29).

Figure 24B:
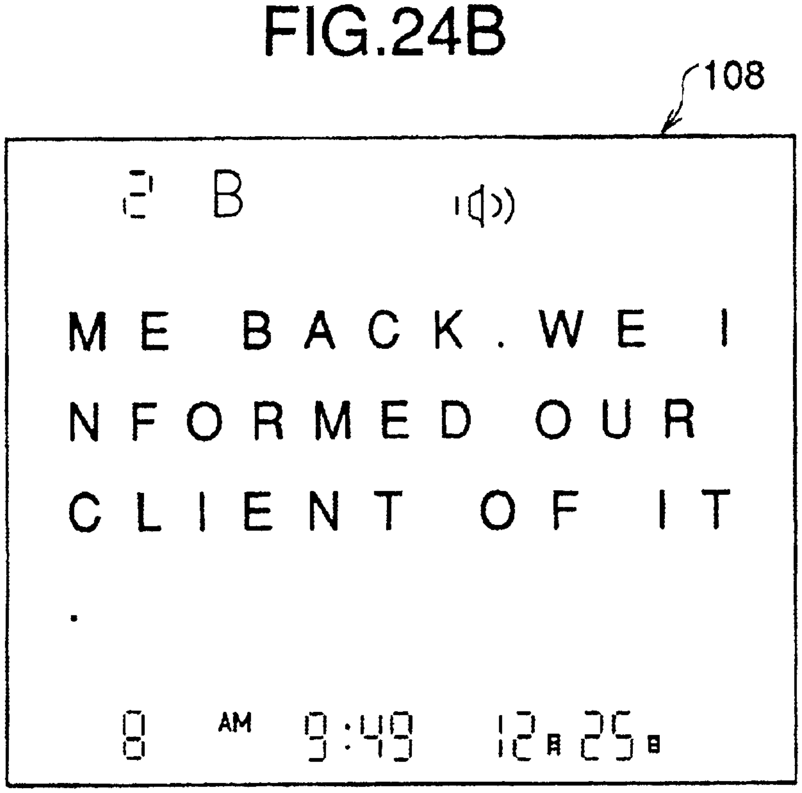

When the display driver 107 receives the remaining characters of the message, the display driver 107 reads display data corresponding to the message and the dot count D3 from the character generator 109 and supplies the display waveform of the display data to the liquid crystal display section 108. In addition, when the display driver 107 receives incoming call time and date, the display driver 107 supplies, to the liquid crystal display section 108, a control signal for displaying the incoming call time and date on the liquid crystal display section 108, and the display contents of the liquid crystal display section 108 are shown in FIG. 24B (step S30).

When it is determined in step S14 that the status indicating whether the dot count of a unit display component is changeable is set to be "fixed dot count", the CPU 106 sends, to the display driver 107, the status designating that the dot count of a unit display component is set to be D2 (step S34). Then, the CPU 106 checks whether the number L of characters of a message stored in the RAM arranged in the CPU 106 satisfies L≧28 (step S35).

When it is determined that the number L does not satisfy L≧28 (NO in step S35), the CPU 106 sends the message and the incoming call time and date to the display driver 107 (step S36).

Figure 25:
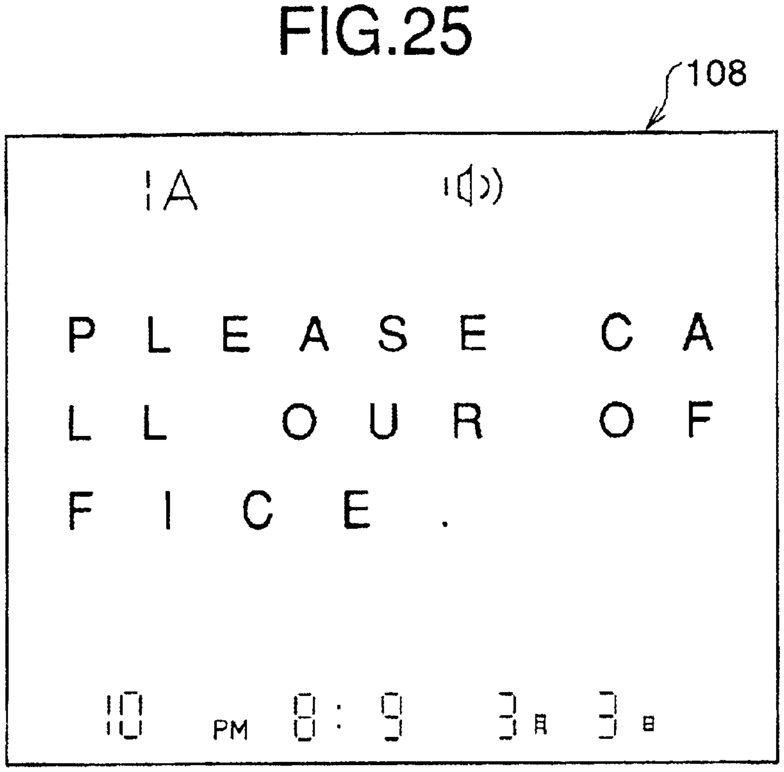
FIGS. 25, 26A, and 26B are views for explaining display samples of the liquid crystal display section when the dot count of each unit display component is fixed.

When the display driver 107 receives a message (e.g., "Please call our office.", the display driver 107 reads display data corresponding to the message and the dot count D2 from the RAM, supplies the display waveform of the display data to the liquid crystal display section 108, and supplies, to the liquid crystal display section 108, a control signal for displaying the incoming call time and date, and the display contents of the liquid crystal display section 108 are shown in FIG. 25 (step S37).

When it is determined that the number L satisfies L≧28 (YES in step S35), the CPU 106 sends a message corresponding to the first twenty-seven characters of the message (e.g., "Please call soon Mr. Suzuki, 03-1234-5678.") stored in the RAM arranged in the CPU 106, incoming call time and date, and a next screen message continuous mark display command to the display driver 107 (step S38).

Figure 26A:
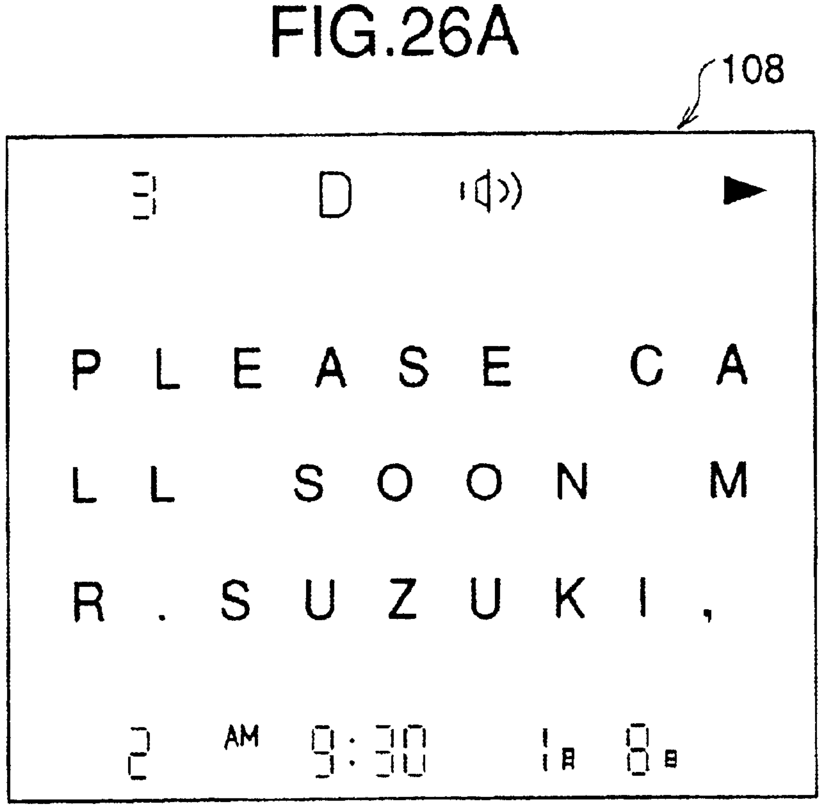

When the display driver 107 receives the message corresponding to the first twenty-seven characters, the display driver 107 reads display data corresponding to the message and the dot count D2 from the character generator 109 and supplies the display waveform of the display data to the liquid crystal display section 108. In addition, when the display driver 107 receives the incoming call time and date and the next screen message continuous mark display command, the display driver 107 supplies, to the liquid crystal display section 108, a control signal for displaying the incoming call time and date and the next screen message continuous mark, and the display contents of the liquid crystal display section 108 are shown in FIG. 26A.

Thereafter, the CPU 106 checks whether the number of remaining characters of the message is twenty-seven or less (step S40).

When it is determined that the number of remaining characters of the message is not twenty-seven or less (NO in step 40), and the next screen display switch of the switches 115 is operated, the flow returns to the processing in step S38, and a message corresponding to the next twenty-seven characters is displayed on the liquid crystal display section 108.

When it is determined that the number of remaining characters of the message is twenty-seven or less (YES in step S40), and the next screen switch is operated, the CPU 106 sends the remaining characters of the message and the incoming call time and date to the display driver 107 (step S41).

Figure 26B:
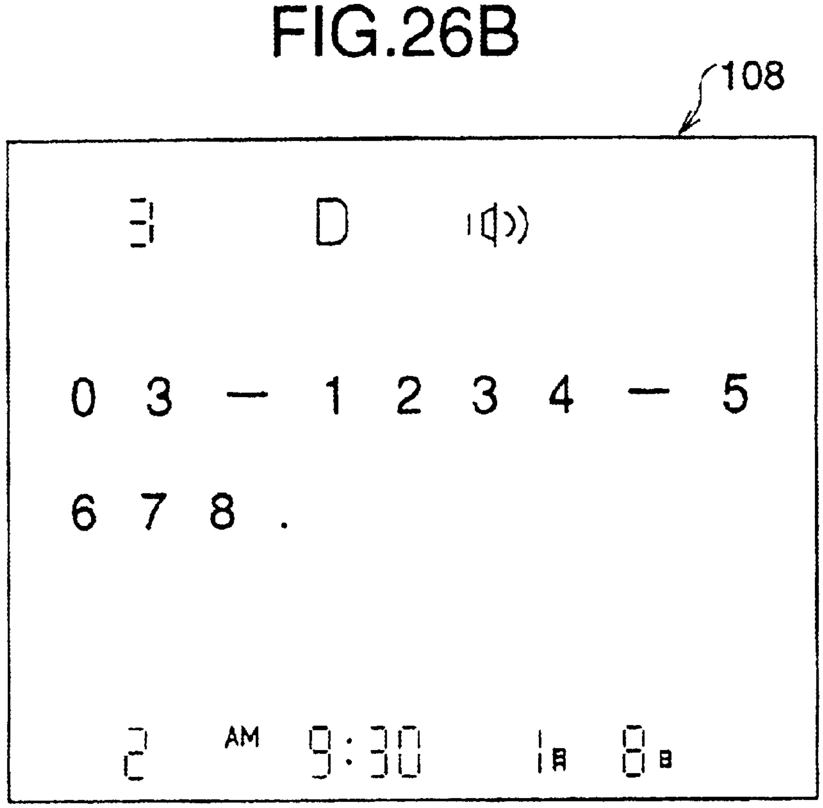

When the display driver 107 receives a message, the display driver 107 reads display data corresponding to the message and the dot count D2 from the character generator 109 and supplies the display waveform of the display data to the liquid crystal display section 108. In addition, when the display driver 107 receives the incoming call time and date, the display driver 107 supplies a control signal for displaying the incoming call time and date to the liquid crystal display section 108, and the display contents of the liquid crystal display section 108 are shown in FIG. 26B (step S42).

Upon completion of display of messages (processing in steps S18, S21, S25, S30, S37, and S42 is completed), the CPU 106 performs key-scanning of the display erasing switch of the switches 115 and timer calculation. When the CPU 106 detects depression of the display erasing switch (YES in step S31), or when the CPU 106 detects that the timer (about 20 seconds in general) is turned off, erasure of the message is designated to the display driver 107. Thereafter, the flow returns to step S1.

It should be understood that the foregoing relates to only preferred embodiments of the present invention, and the present invention is not limited to these embodiments. It will be obvious to those skilled in the art that various modifications and changes can be made without departing from the spirit and scope of the invention.

What we claim is:

1. A radio paging receiver with a display unit, said display unit comprising:

a character generator for generating characters for forming a message;

a display screen for displaying the message; and a controller which controls said display screen, so that (1) if the total number of characters in the message is less than or equal to a first predetermined number, then a first character size is selected, (2) if the total number of characters is more than the first predetermined number but less than or equal to a second predetermined number, then a second character size smaller than the first character size is selected, and (3) if the total number of characters is more than the second predetermined number, then a third character size smaller than the second character size is selected, wherein, if the third character size is selected, and the total number of characters is equal to or greater than a third predetermined number, which is greater than the second predetermined number, then the controller displays the message on successive display screens, and wherein the controller selects a character size from among the first, the second, and the third character sizes only one time for each given message.

2. The radio paging receiver according to claim 1, wherein the controller select the character size only after the total number of characters in the message has been determined.

3. A method for controlling the size of characters in a message to be displayed on a display screen of a radio paging receiver, the method comprising:

determining when a message is present to display on the display screen; and based on the total number of characters in the message, controlling the size of the characters to be displayed on the display screen so that (1) if the total number of characters in the message is less than or equal to a first predetermined number, then a first character size is selected, (2) if the total number of characters is more than the first predetermined number but less than or equal to a second predetermined number, then a second character size smaller than the first character size is selected, and (3) if the total number of characters is more than the second predetermined number, then a third character size smaller than the second character size is selected, wherein, if the third character size is selected, and the total number of characters is equal to or greater than a third predetermined number, which is greater than the second predetermined number, then displaying the message on successive display screens, and wherein the character size is selected from among the first, the second, and the third character sizes only one time for each given message.

4. The method according to claim 3, wherein the character size is selected only after the total number of characters in the message has been determined.

* * * * *